No. 623,783. Patented Apr. 25, 1899.
H. HEULINGS.
FERTILIZER DISTRIBUTER AND SEED PLANTER.
(Application filed Feb. 23, 1899.)
(No Model.)
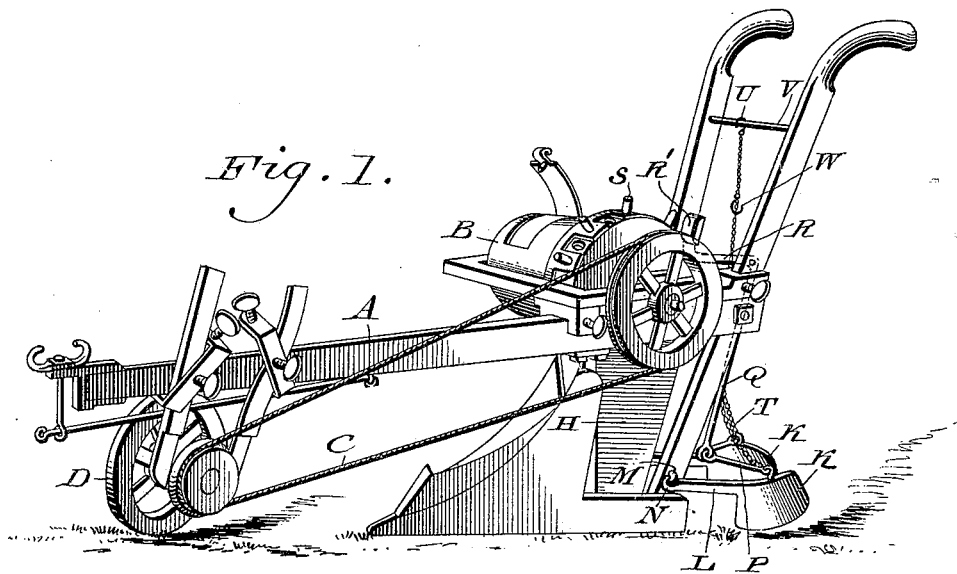
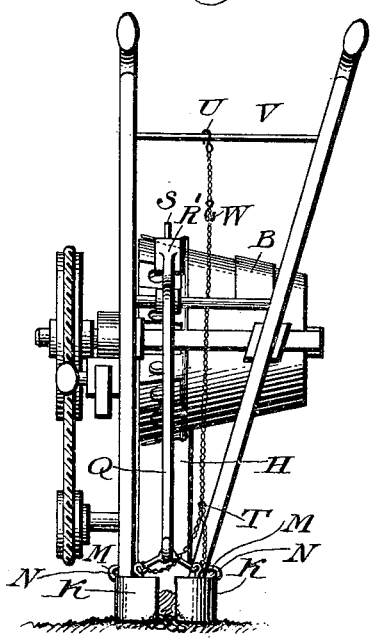
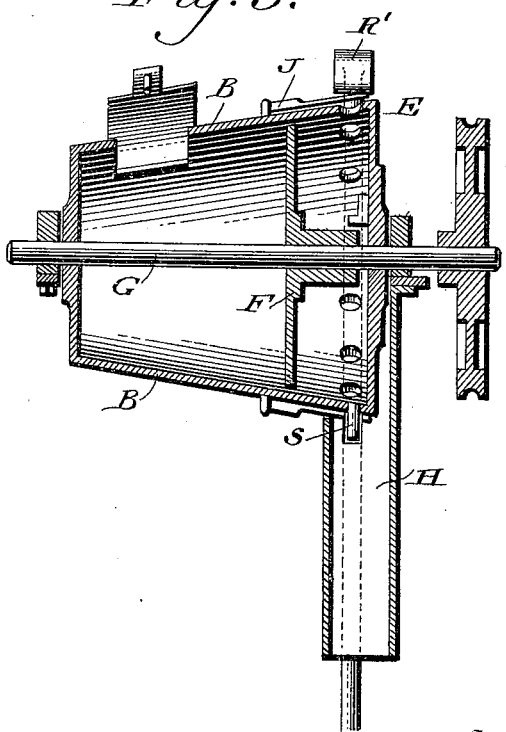

UNITED STATES PATENT OFFICE.

HELEN HEULINGS, OF PHILADELPHIA, PENNSYLVANIA.

FERTILIZER-DISTRIBUTER AND SEED-PLANTER.

SPECIFICATION forming part of Letters Patent No. 623,783, dated April 25, 1899.

Application filed February 23, 1899. Serial No. 706,508. (No model.)

*To all whom it may concern:*

Be it known that I, HELEN HEULINGS, a citizen of the United States, residing in the city and county of Philadelphia, State of Pennsylvania, have invented a new and useful Improvement in Fertilizer-Distributers and Seed-Planters, which improvement is fully set forth in the following specification and accompanying drawings.

This invention consists of devices adapted for attachment to a plow whereby fertilizer, seed, or grain can be dropped and covered within the furrow made by the plow.

The invention comprises a dropping device operated by a wheel mounted upon the forward end of the plow-beam and geared to this seed-dropping device and movable hoes at the lower rear portion of the share that are operated at intervals to cover the fertilizer or seed with earth.

The invention further consists of novel details of construction, all as will be hereinafter fully set forth, and particularly pointed out in the claims.

Figure 1 represents a perspective view showing the invention applied to a plow and the arrangements for working the various parts. Fig. 2 represents a rear end elevation with the shaft and beam removed. Fig. 3 represents a vertical longitudinal section of the drum and seed-tube.

Similar letters of reference indicate corresponding parts in the figures.

Referring to the drawings, A designates the frame of a plow-beam, on which is journaled the seed-drum B, that is operated by means of a belt C, geared to the wheel D, carrying the front end of the plow. The said drum is provided at its large end with the perforations or openings E and interiorly with a partition F, mounted upon the shaft G, said shaft also carrying said drum B. Below the perforated ends of the drum is a spout H, through which the fertilizer or seed is dropped into the furrow, and the drum is provided with a plate or slide J, by means of which the openings are controlled.

The construction above described is similar to that shown in United States Letters Patent, dated April 18, 1882, and numbered 256,799, granted to J. M. Heulings, and the present invention is an improvement thereon. This present invention consists of the hoes K, having the stems L, the latter being pivotally secured in the rear and at the lower end of the plowshare, a convenient pivotal connection consisting of eyes M upon the plow-frame and eyes N on the stems L. This allows the hoes to move laterally and vertically. To the upper edges of the hoes K are pivotally secured the links P, the other end of said links being pivoted to the lower end of a lever Q, pivoted upon the frame A and having its upper limb R extending forwardly and provided with a head R', situated in the path of a plurality of pins or projections S upon the rotatable drum. The said hoes are furthermore connected with the lower end of a chain T, the upper end of which is provided with a hook U for engagement with a cross-piece V of the frame. The said chain T is further provided with a hook W as a convenient means for shortening the same.

The operation is as follows: It is understood, of course, that as the plow progresses the fertilizer or seed is dropped through the spout in a familiar manner, while the pins or projections S of the drum vibrate the lever Q at intervals and move the hoes K toward each other, so as to cover the same with earth in an obvious manner, it being noted that the parts are so timed that the closing of the hoes occurs at the desired intervals. The chain T is lengthened, as shown in Fig. 1, when the device is in operation and shortened, by means of a hook W, to elevate the hoes and to throw them out of operation.

It is understood, of course, that these devices can be applied to existing plows and as readily removed without changing their structure.

Having thus described my invention, what I claim as new, and desire to secure by Letters Patent, is—

1. The combination of a plow and a dropping mechanism of rearwardly-extending hoes pivotally secured to the plow-frame, a vibratory lever upon the said plow-frame, links connected with said hoes and said lever and projections upon the dropping mechanism adapted to contact with said lever and operate said hoes.

2. The combination with a plow and a dropping mechanism of rearwardly-extending hoes pivotally secured to said plow-frame and adapted to move laterally, a lever upon said plow-frame, links connected with said lever and said hoes and projections upon the dropping mechanism adapted to contact with the free end of said lever and to cause said hoes to move toward each other.

3. The combination of a plow and a dropping mechanism of a seed-drum adapted to be suitably operated, projections on said drum, a lever suitably supported and having one end adapted to contact with said projections, hoes secured to said plow and extending rearwardly, links connected with said hoes and with said lever and means for holding said hoes out of operative position.

HELEN HEULINGS.

Witnesses:
WM. C. WIEDERSHEIM,
HARRY COBB KENNEDY.